United States Patent
Shute et al.

(10) Patent No.: US 6,241,058 B1
(45) Date of Patent: Jun. 5, 2001

(54) BRAKE SHOE WITH INSERT BONDED TO BACKING PLATE

(75) Inventors: Bruce W. Shute, West End; Joseph C. Kahr, Southern Pines, both of NC (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/369,983

(22) Filed: Aug. 6, 1999

(51) Int. Cl.$^7$ ............... F16D 65/04; F16D 69/02; F16D 69/04
(52) U.S. Cl. ............... 188/250 B; 188/251 R; 188/251 M
(58) Field of Search ............... 188/251 R, 250 B, 188/57, 59, 73.1, 251 M, 251 A, 247, 248

(56) References Cited

U.S. PATENT DOCUMENTS

| | | | |
|---|---|---|---|
| 412,572 | * | 10/1889 | Whalen . |
| 514,655 | * | 2/1894 | Kerwin . |
| 655,381 | * | 8/1900 | Stromeyer . |
| 678,139 | * | 7/1901 | Spear . |
| 995,067 | * | 6/1911 | Jones . |
| 1,136,936 | * | 4/1915 | Chipley . |
| 3,738,463 | * | 6/1973 | Kunst et al. ............ 188/218 R |
| 4,781,275 | * | 11/1988 | Olsen ............ 188/251 A |
| 5,341,904 | * | 8/1994 | Christie ............ 188/251 R |
| 5,407,031 | * | 4/1995 | Christie ............ 188/29 |
| 5,585,166 | * | 12/1996 | Kearsey ............ 428/212 |
| 5,788,027 | * | 8/1998 | Shute et al. ............ 188/250 B |

OTHER PUBLICATIONS

Nov. 1997 article in The Magazine and Journal of TWI*

* cited by examiner

Primary Examiner—Douglas C. Butler
Assistant Examiner—Melody Burch
(74) Attorney, Agent, or Firm—James Ray & Associates

(57) ABSTRACT

A composition brake shoe for use on a railway vehicle for reconditioning a wheel tread surface during a normal braking application on such railway vehicle is provided. The composition brake shoe includes a backing plate having a stirrup and a brake surface having a predetermined configuration and a predetermined surface area. It further includes a first friction type composition material extending over the surface area of such brake surface of such composition brake shoe. The composition brake shoe further contains a second friction type material, formed as at least one discrete insert, having a predetermined shape and molded into such first friction type composition material. Such second friction type material initially being completely embedded within such first friction type composition material. One surface of such at least one discrete insert being incrementally exposed as such first friction type composition material is eroded away due to frictional engagement with such wheel tread surface during normal braking operations, such second friction type material exhibiting greater abrasive properties than such first friction type composition material. Such at least one discrete insert of such second friction type material is bonded to such backing plate.

15 Claims, 3 Drawing Sheets

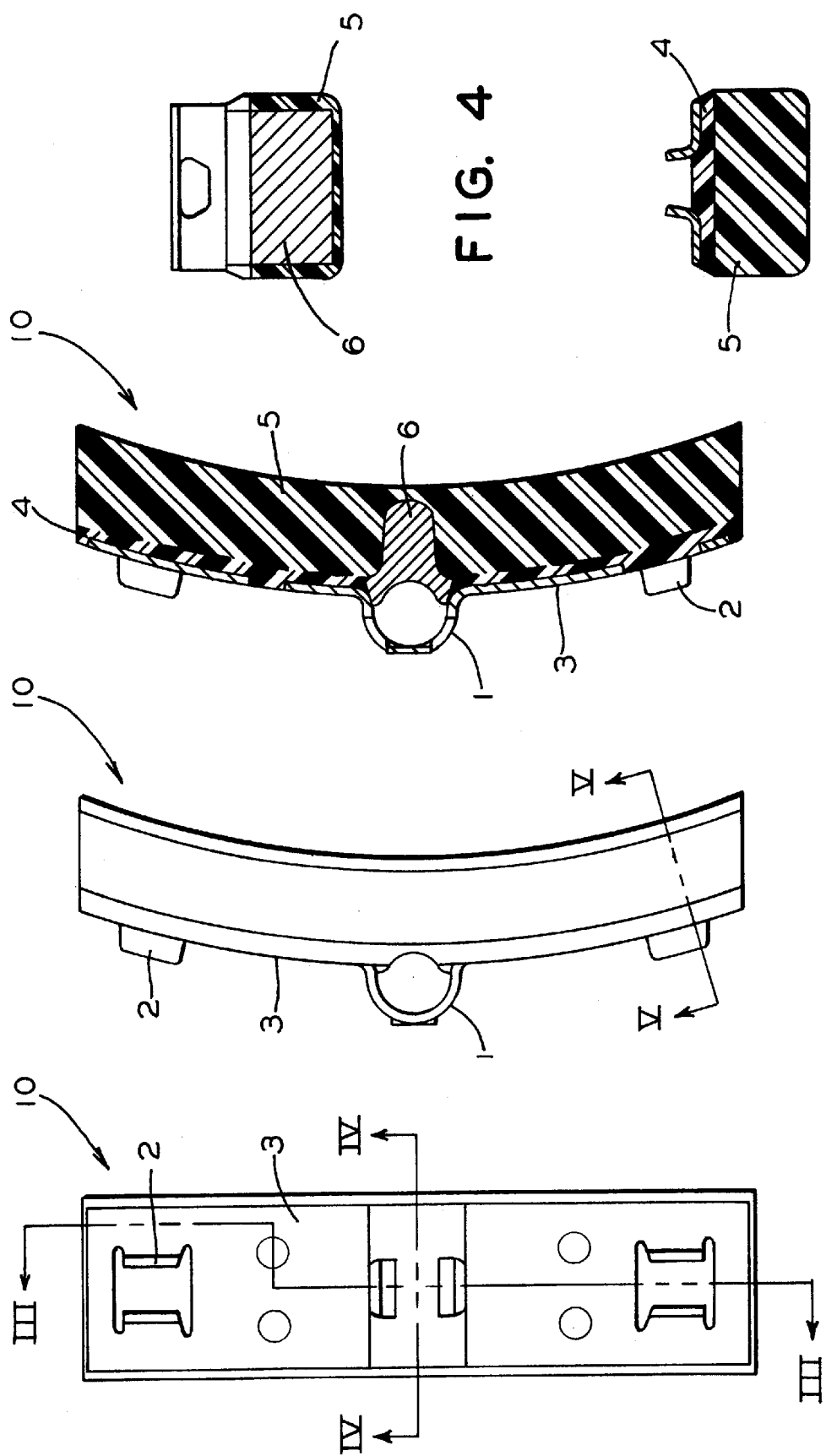

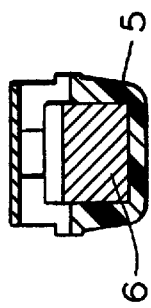
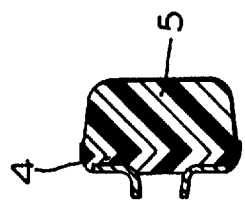
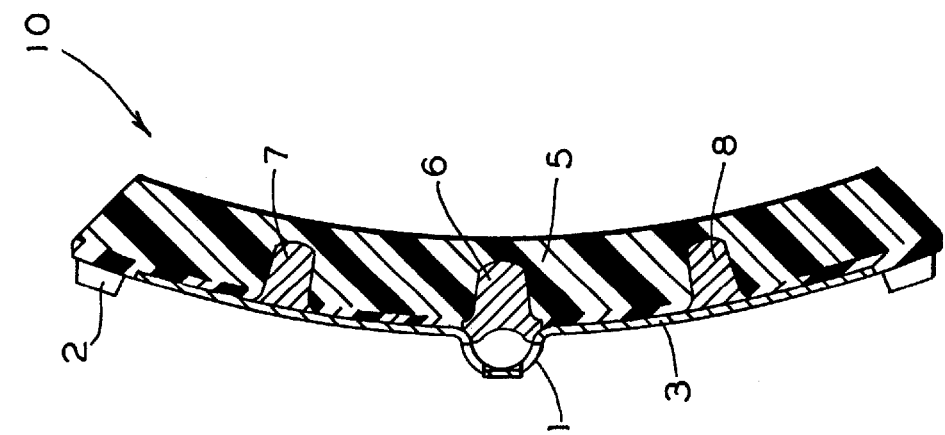
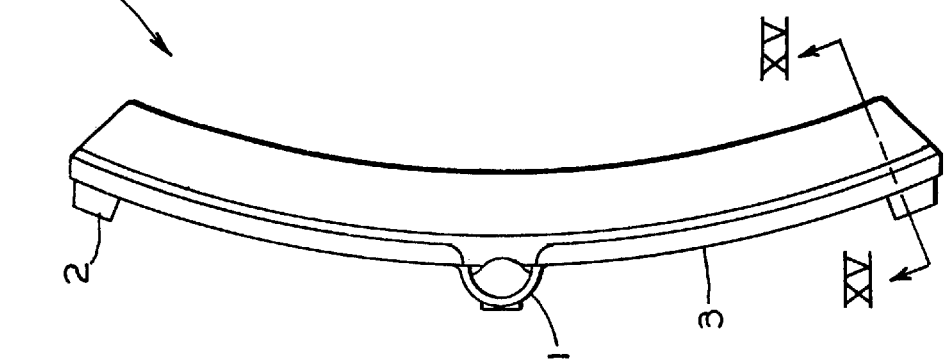
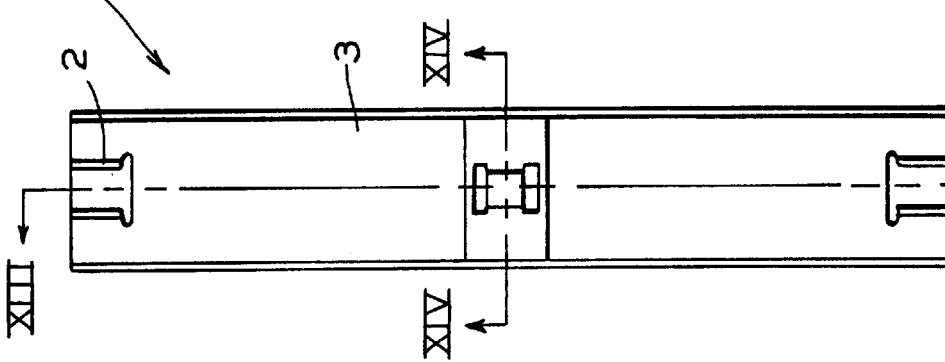

BRAKE SHOE WITH INSERT BONDED TO BACKING PLATE

FIELD OF THE INVENTION

The present invention relates, in general, to railway vehicle type braking equipment and, more particularly, this invention relates to a composition type brake shoe for use in a railway type vehicle brake system and, even still more specifically, the invention relates to an improved brake shoe member with an insert of aggressive high friction material for removing defects of the tread surface of a wheel.

BACKGROUND OF THE INVENTION

Prior to the conception and subsequent development of this invention, it is generally well known in the art to use various type brake shoes having different compositions to achieve quite specific braking requirements. For example, these compositions may include cast iron and various other type friction materials that are specifically formulated for a number of predetermined applications.

It is further well recognized, in the brake shoe art, that these various types of friction material will normally exhibit a number of uniquely different friction characteristics. Such friction characteristics, for example, include both high friction material and low friction material which are usually selected on the basis of braking performance requirements.

Since braking performance is the prime function of brake shoes, use of such lower type friction material may be adequate for braking purposes. However, there is normally no consideration of providing a secondary beneficial function toward the reconditioning of a wheel tread surface that may have surface defects, such as shells or spalls. Removal of these surface defects will normally extend the useful life of a wheel that is in service.

A brake shoe surface could be used which would be aggressive as far as reconditioning the wheel surface; however, this design may not provide appropriate friction levels for braking and may also have a disadvantage of creating significant sparking during brake applications which could result in a hazardous condition.

Applicant is aware of another design which is a shoe material made entirely from the aggressive grinding type material, however, this shoe must be applied and then immediately removed after a very low speed brake application. Thus, there is a need for a reconditioning brake shoe that will not present a safety problem because of inappropriate friction performance or because of a sparking condition while the brake shoe is reconditioning the defective surface of a wheel tread and still further a brake shoe that can continue to be used for normal braking operations after the wheel tread has been reconditioned.

SUMMARY OF THE INVENTION

The present invention provides a composition brake shoe for use on a railway vehicle for reconditioning a wheel tread surface during a normal braking application on such railway vehicle. The composition brake shoe includes a backing plate having a stirrup and a brake surface having a predetermined configuration and a predetermined surface area. It further includes a first friction type composition material extending over the surface area of such brake surface of such composition brake shoe. The composition brake shoe further contains a second friction type material, formed as at least one discrete insert, having a predetermined shape and molded into such first friction type composition material. Such second friction type material initially being completely embedded within such first friction type composition material. One surface of such at least one discrete insert being disposed facing such predetermined surface area of such brake surface of such composition brake shoe, such one surface of such discrete insert being incrementally exposed as such first friction type composition material is eroded away due to frictional engagement with such wheel tread surface during normal braking operations, such second friction type material exhibiting greater abrasive properties than such first friction type composition material. Such at least one discrete insert of such second friction type material is bonded to such backing plate.

OBJECTS OF THE INVENTION

It is, therefore, one of the primary objects of the present invention to provide a brake shoe with an aggressive grinding material in a composition brake shoe matrix which will remove defects from the tread surface of a wheel during normal braking applications.

It is also an object of the present invention to provide a brake shoe which will at least substantially minimize production of a sparking condition while removing defects from the tread surface.

It is still another object of the present invention to provide a brake shoe which will extend the useful life of a wheel in service by reducing the need to remachine or reprofile wheels to remove defects from the tread surface.

Yet, it is still another object of the present invention to provide a brake shoe which will provide the correct friction for braking while at the same time removing wheel tread surface defects.

Still, it is another object of the present invention to provide a brake shoe which will strengthen such backing plate at stress points where potential failures may occur.

Additionally, it is a further object of the present invention to provide a brake shoe which can be used to recondition a wheel tread and still remain in service on the railway vehicle until the shoe is fully worn.

In addition to the various objects and advantages of the present invention which have been described in some specific detail above, various additional objects and advantages of the invention will become much more readily apparent to those persons who are particularly skilled in the relevant brake shoe friction art from the following more detailed description of such invention, particularly, when such detailed description is taken in conjunction with the attached drawing Figures and with the appended claims.

BRIEF DESCRIPTION OF THE DRAWINGS

FIG. 1 is a plan view of the back of a railway brake shoe showing a steel backing plate used for mounting a brake shoe to the railway vehicle in a first embodiment of the invention.

FIG. 2 is a side elevation view of the railway brake shoe illustrated in FIG. 1.

FIG. 3 is a cross sectional view of the railway brake shoe taken along the lines III—III of FIG. 1 which incorporates a presently preferred embodiment of the present invention therein.

FIG. 4 is a cross sectional view of the railway brake shoe taken along the lines IV—IV of FIG. 1.

FIG. 5 is a cross sectional view of the railway brake shoe taken along the lines V—V of FIG. 2.

FIG. 11 is a plan view of the back of a railway brake shoe showing a steel backing plate used for mounting a brake shoe to the railway vehicle according to a third embodiment of the invention.

FIG. 12 is a side elevation view of the railway brake shoe illustrated in FIG. 11.

FIG. 13 is a cross sectional view of the railway brake shoe taken along the lines XIII—XIII of FIG. 11 which incorporates a third embodiment of the present invention therein.

FIG. 14 is a cross sectional view of the railway brake shoe taken along the lines XIV—XIV of FIG. 11.

FIG. 15 is a cross sectional view of the railway brake shoe taken along the lines XV—XV of FIG. 12.

Figure 9:
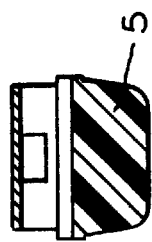
FIG. 9 is a cross sectional view of the railway brake shoe taken along the lines IX—IX of FIG. 6.

BRIEF DESCRIPTION OF THE PRESENTLY PREFERRED AND VARIOUS ALTERNATIVE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Reference is now made more specifically to FIGS. 1 and 2. Illustrated therein is a conventional brake shoe configuration, generally designated 10, capable of having an embodiment of the present invention incorporated therein. Brake shoe 10 includes a stirrup 1 connected to a backing plate 3 to which a composition type brake shoe member is secured. Brake shoe 10 further includes an abutment portion 2 which engages a brake head cavity (not shown). The backing plate 3 and abutment portion 2 are used to position and attach such brake shoe 10 to the brake head portion (not shown) of the brake beam portion of a predetermined brake system.

Reference is now made more specifically to FIGS. 3, 4 and 5. FIGS. 3, 4 and 5 are cross sectional views taken along the lines of III—III, IV—IV and V—V, respectively, of FIGS. 1 and 2. Illustrated therein is a presently preferred embodiment of the invention. As shown therein, brake shoe 10 has a steel backing plate 3 and a backing stock layer 4 for bonding first friction type composition material 5 to backing plate 3. First friction type composition material 5 of the brake shoe 10, according to the present invention, is a composition friction type material which extends over the surface area of brake shoe 10 and provides the required friction and braking effort when forced against the tread of a railway wheel. The surface of such brake shoe 10, when used in a railway braking system, will exhibit a generally arcuate shape. First friction type composition material 5 will hereinafter be referred to as base material 5.

Embedded in such base material 5 is at least one discrete insert of a second friction type material 6. Such second friction type material 6 is formed as a discrete insert, having a predetermined shape, and is molded into base material 5. Second friction type material 6 initially is completely embedded within base material 5. One surface of the such discrete insert of second friction type material 6 being disposed facing such predetermined surface area of such brake surface of such composition brake shoe 10. Such one surface of second friction type material 6 being incrementally exposed as base material 5 is eroded away due to frictional engagement with such wheel tread surface during normal braking operations. Second friction type material 6 exhibits greater abrasive properties than such base material 5 and enhances friction performance of such brake shoe under adverse weather conditions. Such second friction type material 6 consists essentially of a material used for grinding wheels. In a preferred embodiment of the invention such second friction material is metal. In a presently preferred embodiment of the invention such metal is cast iron.

Also in a presently preferred embodiment of the invention such second friction material 6 is bonded to the inner portion of the stirrup 1 of backing plate 3. Bonding such discrete insert of such second friction material 6 to the stirrup 1 provides additional strength to the stirrup 1. Further, bonding such discrete insert 6 to such backing plate 3 holds the material in place while the first friction composition material 5 is bonded around such discrete insert 6. It is important that the discrete insert 6 be imbedded within and not extend to the surface of such first friction composition material 5 so as to permit such first friction composition material 5 to flow properly around such discrete insert 6 during manufacture. In a presently preferred embodiment of the invention such bonding of discrete insert 6 to backing plate 3 is by means of welding.

Figure 10:
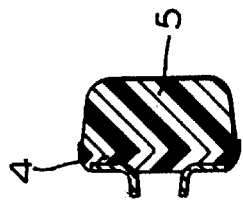
FIG. 10 is a cross sectional view of the railway brake shoe taken along the lines X—X of FIG. 7.
Figure 8:
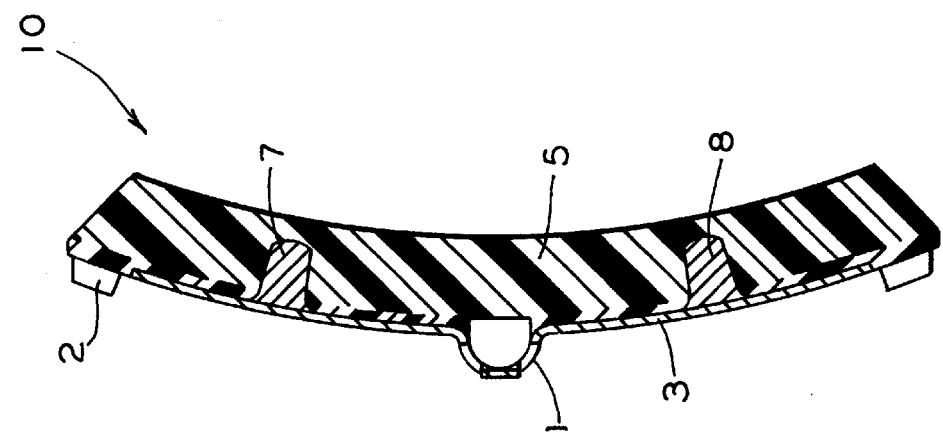
FIG. 8 is a cross sectional view of the railway brake shoe taken along the lines VIII—VIII of FIG. 6 which incorporates a second embodiment of the present invention therein.
Figure 7:
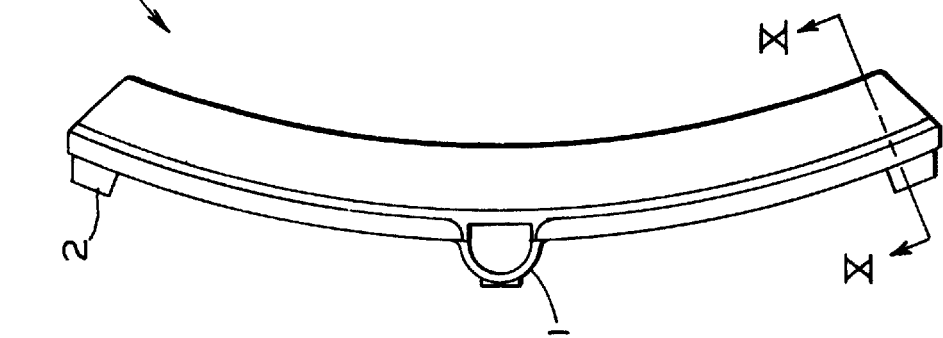
FIG. 7 is a side elevation view of the railway brake shoe illustrated in FIG. 6.
Figure 6:
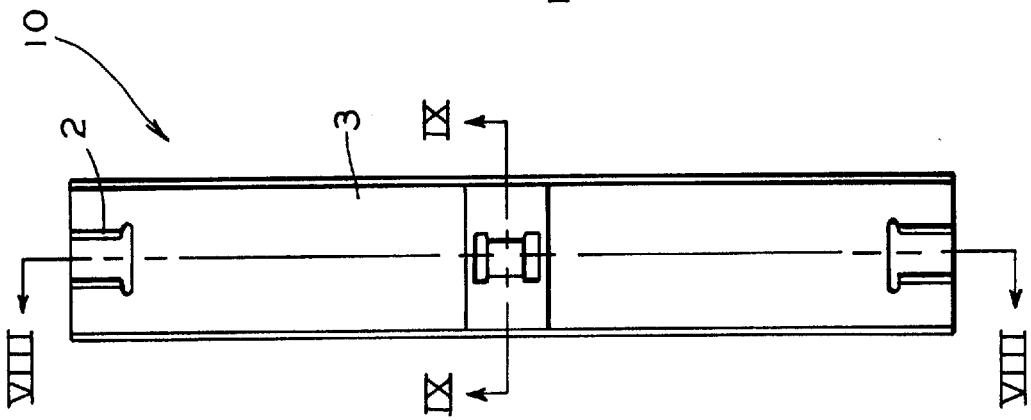
FIG. 6 is a plan view of the back of a railway brake shoe showing a steel backing plate used for mounting a brake shoe to the railway vehicle according to a second embodiment of the invention.

A second embodiment of the invention is illustrated in FIGS. 6 to 10. As is evident in FIG. 7, there are two discrete inserts of such second friction material 7 and 8. In this embodiment of the invention such discrete inserts 7 and 8 are each disposed at a point that is intermediate between the ends of such brake shoe and a center point of such brake shoe. In a presently preferred embodiment of the invention such discrete inserts 7 and 8 are substantially equidistant from such center point of the brake shoe and the ends of the brake shoe. Such discrete inserts 7 and 8 of such second friction material are also bonded to such backing plate. Also in a presently preferred embodiment such discrete inserts 7 and 8 are welded to backing plate 3.

Reference in now made to FIGS. 11 through 15. Illustrated therein is a third embodiment of the invention. As is evident in FIGS. 13 and 14, there are three discrete inserts 6, 7, and 8 of such second friction material. Again as is evident such three discrete inserts 6, 7, and 8 are all bonded to such backing plate 3. Again, it is presently preferred that such bonding be accomplished by welding.

Such brake shoe 10 is applied to a railway wheel (not shown) which may exhibit certain detrimental type defects on the tread surface of the wheel. These defects are called shells or spalls. As is evident in FIGS. 3 and 4 of brake shoe 10, such discrete insert 6 is surrounded by base material 5. As the outer surface of base material 5 wears away through normal braking operations, discrete insert 6 is incrementally exposed and during any subsequent braking operation provides a more aggressive abrasive machining effect on the wheel tread to remove surface defects enhanced grinding and reconditioning of the tread surface of such railway wheel. Such enhanced grinding and reconditioning of the wheel tread continues as long as the shoe remains usable, at least to the condemning point of the shoe. Further, brake shoes with the second and third embodiments described above and in FIGS. 8 and 13 provide a surface with significantly greater abrasion, once the outer surface of base material 5 has been worn away through normal braking operations. Discrete inserts 6,7 and 8 become incrementally exposed and provide twice or three times the abrasive surfaces to recondition such wheel tread than does the first embodiment.

This complete process is designed to extend the useful life of a wheel in service. The process requires a minimum of wheel tread maintenance effort on a wheel, which has exhibited certain types of tread defects, since all that is required to recondition such wheel tread is the replacement of an existing brake shoe with a brake shoe 10 of the instant invention. The wheel tread surface is reconditioned during normal braking operations without any additional labor. Thus, brake shoe 10 reconditions the wheel tread surface and can remain on the railway vehicle for the life of the brake shoe. With the reconditioning of the wheel tread, the useful life of the wheel is extended significantly.

While both the presently preferred and a number of alternative embodiments of the present invention have been described in detail above it is understood that various other adaptations and modifications of the present invention can be envisioned by those persons who are skilled the relevant art of brake shoes without departing from either the spirit of the invention or the scope of the appended claims.

We claim:

1. A composition brake shoe for use on a railway vehicle for reconditioning a wheel tread surface of such railway vehicle during a normal braking application on such vehicle, said composition brake shoe comprising:
   (a) a backing plate having a stirrup portion,
   (b) a first friction type composition material formed into a brake shoe having a predetermined shape;
   (c) a brake surface for engaging a wheel tread having a predetermined configuration formed in said brake shoe and having predetermined surface area; and
   (d) a second friction type material formed as at least one discrete insert, having a predetermined shape and molded into said first friction type composition material, said second friction type material initially being completely embedded within said first friction type composition material, one surface of said at least one discrete insert being disposed facing said predetermined surface area of said brake surface of said composition brake shoe, said one surface of said at least one discrete insert being exposed as said first friction type composition material is eroded away due to frictional engagement with such wheel tread surface during normal braking operations, said second friction type material exhibiting greater abrasive properties than said first friction type composition material, said at least one discrete insert of said second friction material is directly bonded to said backing plate.

2. A composition brake shoe for use on a railway vehicle for reconditioning a wheel tread surface, according to claim 1, wherein said at least one discrete insert of said second friction material is metal.

3. A composition brake shoe for use on a railway vehicle for reconditioning a wheel tread surface, according to claim 2, wherein said metal is cast iron.

4. A composition brake shoe for use on a railway vehicle for reconditioning a wheel tread surface, according to claim 1, wherein said at least one discrete insert is bonded to an inner surface of said stirrup portion of said backing plate.

5. A composition brake shoe for use on a railway vehicle for reconditioning a wheel tread surface, according to claim 4, wherein bonding of said at least one discrete insert is accomplished by welding which further strengthens said stirrup portion of said backing plate.

6. A composition brake shoe for use on a railway vehicle for reconditioning a wheel tread surface, according to claim 1, wherein said composition brake shoe includes at least two discrete inserts.

7. A composition brake shoe for use on a railway vehicle for reconditioning a wheel tread surface, according to claim 6, wherein at least one of said two discrete inserts is disposed in an area of said backing plate other than said stirrup portion.

8. A composition brake shoe for use on a railway vehicle for reconditioning a wheel tread surface, according to claim 7, wherein said at least two discrete inserts are bonded to said backing plate by means of welding.

9. A composition brake shoe for use on a railway vehicle for reconditioning a wheel tread surface, according to claim 6, wherein said at least two discrete inserts are each positioned substantially equidistant from a longitudinal center line of said stirrup.

10. A composition brake shoe for use on a railway vehicle for reconditioning a wheel tread surface, according to claim 1, wherein said composition brake shoe includes at least three discrete inserts.

11. A composition brake shoe for use on a railway vehicle for reconditioning a wheel tread surface, according to claim 10, wherein one of said at least three discrete inserts is bonded to said stirrup portion of said backing plate.

12. A composition brake shoe for use on a railway vehicle for reconditioning a wheel tread surface, according to claim 11, wherein said three discrete inserts are bonded to said backing plate by means of welding which strengthens said stirrup portion of said backing plate.

13. A composition brake shoe for use on a railway vehicle for reconditioning a wheel tread surface, according to claim 1, wherein said predetermined configuration of said brake surface is arcuate in a longitudinal direction.

14. A composition brake shoe for use on a railway vehicle for reconditioning a wheel tread surface, according to claim 1, wherein said first friction type composition material is bonded to said backing plate during molding.

15. A composition brake shoe for use on a railway vehicle for reconditioning a wheel tread surface, according to claim 1, wherein said predetermined shape of said first friction type composition material is generally rectangular on a plane disposed perpendicular to that of a longitudinal direction of said brake shoe and said predetermined surface area of said brake surface exhibits a concave shape so as to conform to a surface of a wheel tread of a railway wheel and an opposed surface to said brake surface exhibits a convex shape for molding to said backing plate of said brake shoe and generally arcuate edges disposed along said longitudinal direction of said brake shoe.

* * * * *